(12) United States Patent
Yang (10) Patent No.: US 9,092,193 B2
(45) Date of Patent: Jul. 28, 2015

(54) ELECTRONIC DEVICE

(71) Applicant: Wistron Corp., New Taipei (TW)

(72) Inventor: Chun-Fei Yang, New Taipei (TW)

(73) Assignee: WISTRON CORP., New Taipei (TW)

(*) Notice: Subject to any disclaimer, the term of this patent is extended or adjusted under 35 U.S.C. 154(b) by 13 days.

(21) Appl. No.: 14/141,662

(22) Filed: Dec. 27, 2013

(65) Prior Publication Data

US 2014/0254079 A1    Sep. 11, 2014

(30) Foreign Application Priority Data

Mar. 5, 2013  (TW) .............................. 102107575 A (51) Int. Cl.
*H05K 5/00* (2006.01)
*H05K 7/00* (2006.01)
*G06F 1/16* (2006.01)

(52) U.S. Cl.
CPC .............. *G06F 1/1632* (2013.01); *G06F 1/166* (2013.01); *G06F 1/1616* (2013.01); *G06F 1/1624* (2013.01); *G06F 1/1669* (2013.01)

(58) Field of Classification Search
None
See application file for complete search history.

(56) References Cited

U.S. PATENT DOCUMENTS

| | | | | |
|---|---|---|---|---|
| 5,494,447 A * | 2/1996 | Zaidan | ............................ | 439/31 |
| 5,548,478 A * | 8/1996 | Kumar et al. | ............ | 361/679.27 |
| 6,903,927 B2 * | 6/2005 | Anlauff | ..................... | 361/679.28 |
| 7,107,084 B2 * | 9/2006 | Duarte et al. | ............. | 455/575.3 |
| 7,187,538 B2 * | 3/2007 | Homer et al. | ............ | 361/679.21 |
| 7,583,496 B2 * | 9/2009 | Lai | .............................. | 361/679.3 |
| 8,199,475 B2 * | 6/2012 | Yeh et al. | ................. | 361/679.27 |
| 8,300,416 B2 * | 10/2012 | Yang et al. | ..................... | 361/755 |
| 8,369,076 B2 * | 2/2013 | Chuang et al. | ........... | 361/679.27 |
| 8,483,784 B2 * | 7/2013 | Griffin et al. | .............. | 455/575.3 |
| 8,542,499 B2 * | 9/2013 | Skull | ............................. | 361/825 |
| 8,640,306 B2 * | 2/2014 | Hirota | ............................ | 16/334 |
| 8,649,161 B2 * | 2/2014 | Kato | ........................ | 361/679.01 |
| 8,713,758 B2 * | 5/2014 | Mitsui et al. | .................... | 16/357 |
| 8,934,219 B2 * | 1/2015 | Gartrell et al. | ........... | 361/679.01 |
| 2002/0130243 A1 * | 9/2002 | Ziegler et al. | ................. | 248/685 |
| 2003/0109230 A1 * | 6/2003 | Duarte et al. | ................... | 455/90 |
| 2004/0157653 A1 * | 8/2004 | Kato | ......................... | 455/575.4 |
| 2004/0245420 A1 * | 12/2004 | Pfister et al. | ............. | 248/289.11 |

(Continued)

FOREIGN PATENT DOCUMENTS

| | | |
|---|---|---|
| CN | 201226117 | 4/2009 |
| TW | 496542 | 7/2002 |
| TW | 200727321 | 7/2007 |

OTHER PUBLICATIONS

Taiwanese language office action dated Apr. 1, 2015, issued in application No. 102107575.

(Continued)

*Primary Examiner* — Hoa C Nguyen
*Assistant Examiner* — Xanthia C Cunningham
(74) *Attorney, Agent, or Firm* — McClure, Qualey & Rodack, LLP (57) ABSTRACT

An electronic device is disclosed, which includes a first unit and a second unit. The first unit includes a housing and a connecting member disposed on the housing. The second unit includes a stand, wherein a guiding rail is formed on the support. When the first unit is selectively connected to the second unit, the connecting member of the first unit is inserted into the guiding rail of the second unit and moves therein so as to allow the electronic device to be adjusted into different configurations.

10 Claims, 6 Drawing Sheets

(56) References Cited

U.S. PATENT DOCUMENTS

| | | |
|---|---|---|
| 2005/0207101 A1* | 9/2005 | Hwang et al. .................. 361/681 |
| 2006/0244700 A1* | 11/2006 | Sano et al. ....................... 345/87 |
| 2007/0136998 A1* | 6/2007 | Kim ................................ 16/367 |
| 2008/0180892 A1* | 7/2008 | Lai ................................ 361/680 |
| 2008/0297995 A1* | 12/2008 | Lai ................................ 361/680 |
| 2009/0174988 A1* | 7/2009 | Roehl ....................... 361/679.01 |
| 2009/0183341 A1* | 7/2009 | Chuan ............................ 16/358 |
| 2009/0233659 A1 | 9/2009 | Ke et al. |
| 2010/0149741 A1* | 6/2010 | Liu ........................... 361/679.08 |
| 2010/0188350 A1* | 7/2010 | Sawada ........................ 345/173 |
| 2010/0238620 A1* | 9/2010 | Fish ........................ 361/679.09 |
| 2011/0023272 A1* | 2/2011 | Huang ............................ 16/362 |
| 2011/0032667 A1* | 2/2011 | Kobayashi et al. ....... 361/679.01 |
| 2011/0058322 A1* | 3/2011 | Lee et al. .................. 361/679.01 |
| 2011/0102984 A1* | 5/2011 | Pfister et al. ............. 361/679.01 |
| 2011/0292584 A1* | 12/2011 | Hung et al. .............. 361/679.26 |
| 2012/0099267 A1* | 4/2012 | Ahn et al. ................. 361/679.27 |
| 2012/0293923 A1* | 11/2012 | Holman et al. .......... 361/679.01 |
| 2013/0155584 A1* | 6/2013 | Chen ........................ 361/679.01 |
| 2014/0097316 A1* | 4/2014 | Hsu et al. ...................... 248/351 |

OTHER PUBLICATIONS

English language translation of relevant paragraphs from Taiwanese language office action.

* cited by examiner

ELECTRONIC DEVICE

CROSS REFERENCE TO RELATED APPLICATIONS

This application claims priority of Taiwan Patent Application No. 102107575, filed on Mar. 5, 2013, the entirety of which is incorporated by reference herein.

BACKGROUND OF THE INVENTION

1. Field of the Invention

The present invention relates to an electronic device and, more particularly, to an electronic device which is able to be used in variant configurations.

2. Description of the Related Art

There are various bases and charging units in the prior art for supporting various types of portable electronic devices (e.g., tablet PCs, e-readers, etc.). Most of these devices mount the device in an upright orientation, and the orientation angle is not adjustable. Thus, the user is not able to select a degree of incline that is best suited for his or her use.

Additionally, instead of receiving input through the customary keyboard input devices, the portable electronic devices provide user interaction through a touch interface on the display that accepts stylus or touch gestures. Since it is not convenient for the users to input data by the touch interface, an additional mechanical keyboard module is selectively applied to the portable electronic device. Thus, a need exists for a mechanism which facilitates fast assembly of portable electronic devices and a keyboard module.

BRIEF SUMMARY OF THE INVENTION

In one embodiment of the disclosure, the electronic device includes a first unit and a second unit. The first unit includes a housing and a connecting member. The housing has two opposite lateral surfaces, and the connecting member is disposed on one of the two lateral surfaces. The second unit includes a stand and a fixing member. A guiding rail is disposed in the stand, and the guiding rail includes: an opening; a first section substantially extending along a first direction from the opening; a second section connected to the first section; and a third section connected to the second section and extending along a second direction which is different from the first direction. The fixing member is disposed at the first section of the guiding rail.

By the arrangement of the electronic device, after the first unit is selectively connected to the second unit, the connecting member is inserted into the guiding rail via the opening, wherein the movement of the connecting member in the first section causes a displacement of the fixing member, and after the connecting member passes through the first section and enters the second section, the connecting member is retained by the fixing member.

Additionally, the second section of the guiding rail includes a curved inner wall. When the connecting member is located in the second section, the connecting member is retained between the fixing member and the curved inner wall of the second section. The connecting member is rotatable around a rotation axis which is parallel to a centre of curvature of the curved inner wall.

In the above-mentioned embodiment, the third section of the guiding rail has another inner wall adjacent to the curved inner wall of the second section, and a height of a portion of the curved inner wall of the second section is below an imaginary line extending from the inner wall of the third section.

In the above-mentioned embodiment, a recess is disposed on an inner wall of the first section, and the fixing member comprises an elastic member and a main body, wherein the elastic member is connected between a bottom surface of the recess and the main body, and the main body is retractable into the recess after the main body is pushed by an external force. According to another embodiment, the fixing member comprises an elastic sheet disposed on an inner wall of the first section of the guiding rail.

In the above-mentioned embodiment, the electronic device is adjustable between a first mode and a second mode. In the first mode the connecting member is located in the second section, and an included angle is formed between the first unit and the second unit. In the second mode the connecting member is located in an end portion of the third section which is away from the second section, and the first unit overlaps on the second unit so as to minimize a thickness of the electronic device.

In the above-mentioned embodiment, the first unit further comprises a supporting member pivotably connected to the housing, and the housing comprises an accommodation space, wherein the supporting member is pivoted out of the accommodation space in the first mode, and the supporting member is received in the accommodation space in the second mode.

In the above-mentioned embodiment, the first unit is a computer with a built-in touch screen interface with an operation system and the second unit comprises a keyboard module which is electrically connected to the computer.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
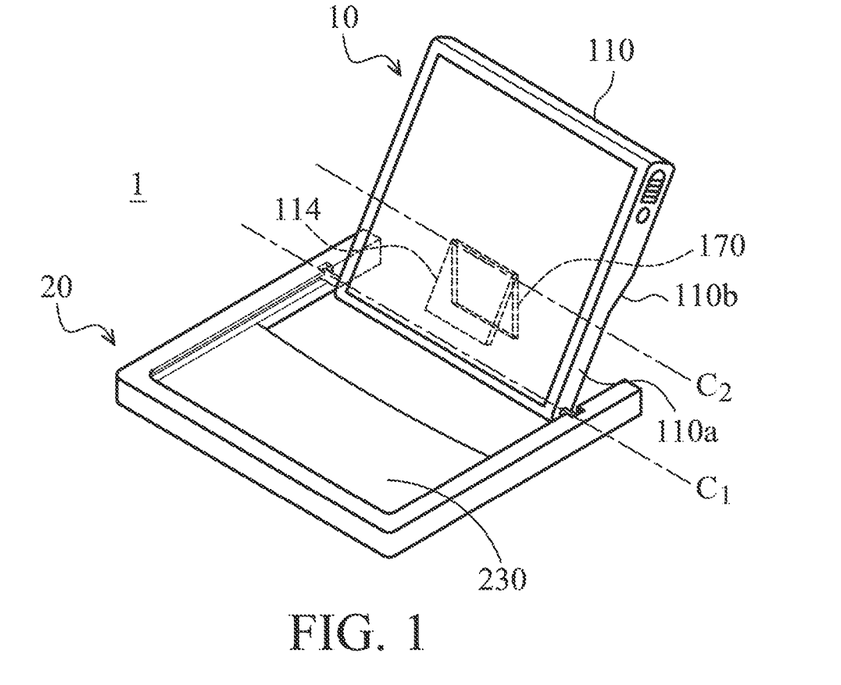
FIG. 1 shows a schematic view of an electronic device in accordance with an embodiment of the disclosure in a first mode.
Figure 2:
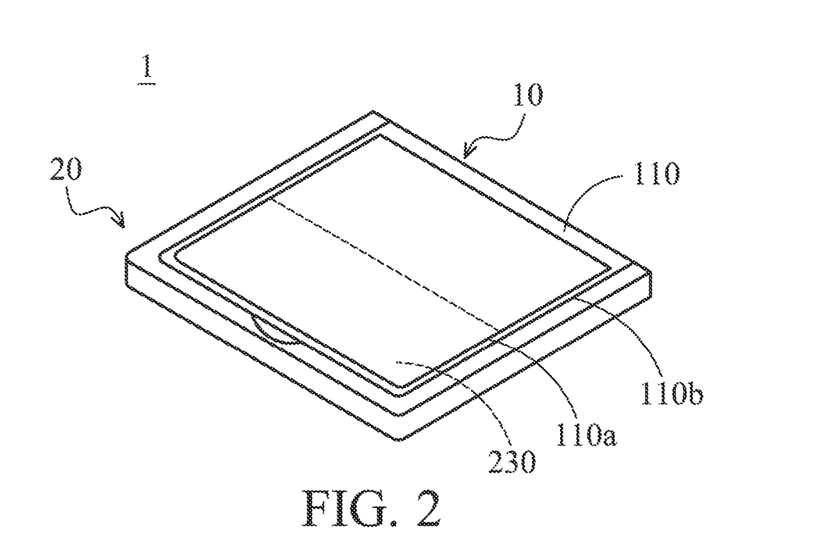
FIG. 2 shows a schematic view of the electronic device in accordance with an embodiment of the disclosure in a second mode.

The following description is of the best-contemplated mode of carrying out the invention. This description is made for the purpose of illustrating the general principles of the invention and should not be taken in a limiting sense. The scope of the invention is best determined by reference to the appended claims Referring to FIGS. 1 and 2, an electronic device 1 according to an embodiment of the disclosure includes a first unit 10 and a second unit 20, wherein the first unit 10 is detachably connected to the second unit 20. After the first unit 10 and the second unit 20 are connected, the electronic device 1 is adjustable between a first mode (FIG. 1) and a second mode (FIG. 2). The structural features of the first unit 10 and the second unit 20 are illustrated in detail hereinafter.

Figure 3:
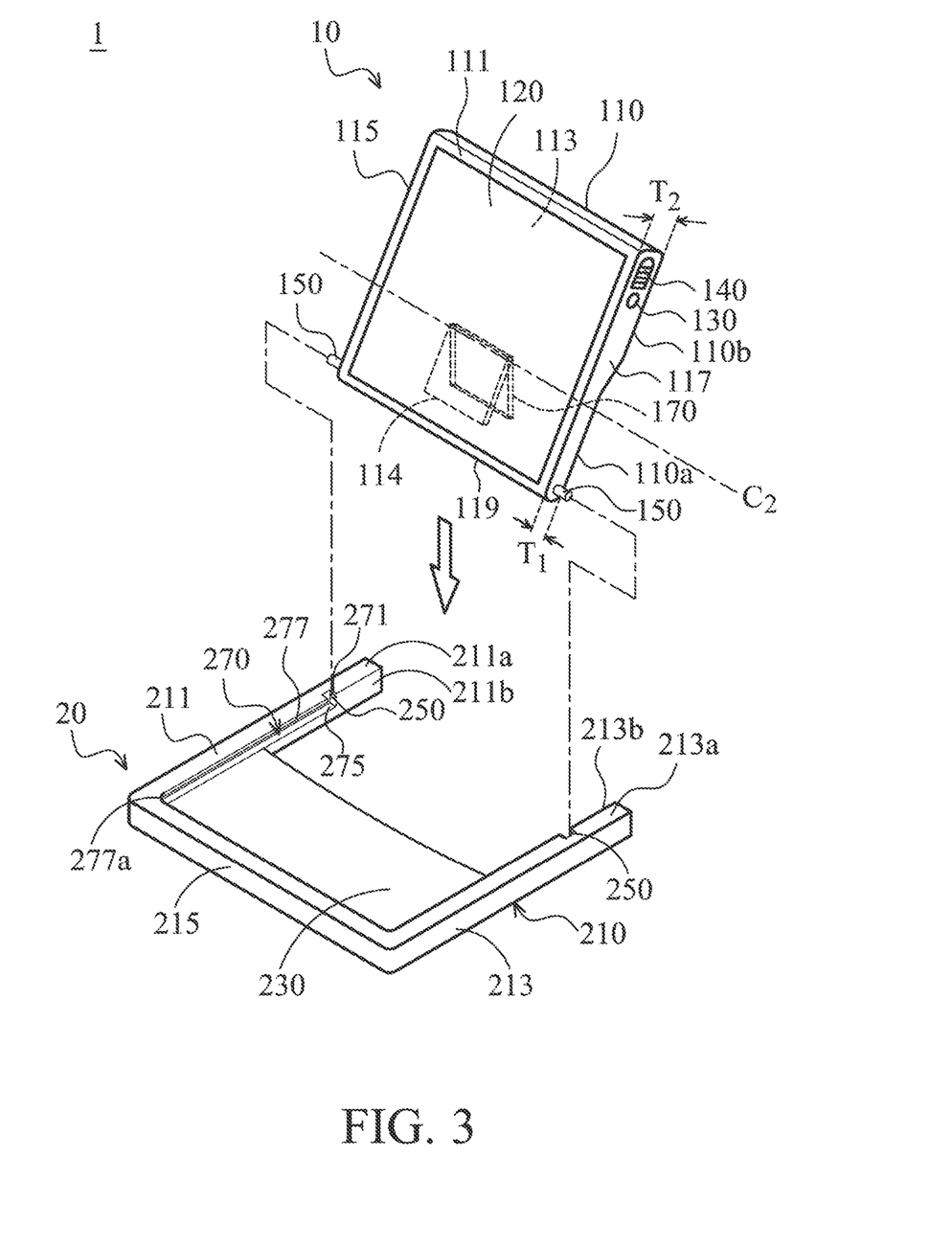
FIG. 3 shows an explosive view of the electronic device of FIG. 1.

Referring to FIG. 3, in one unlimited embodiment, the first unit 10 is a computer with a built-in touch screen interface with an operation system. The first unit 10 includes a housing 110, a touch screen 120, a receptacle 130, a switch 140, two connecting members 150 and a supporting member 170. The housing 110 has a front surface 111, a rear surface 113, two opposite lateral surfaces 115 and 117, and a bottom surface 119. The front surface 111 is opposite to the rear surface 113, and the two opposite lateral surfaces 115 and 117 and the bottom surface 119 are respectively connected between the front surface 111 and the rear surface 113, and the bottom surface 119 is connected between the two opposite lateral surfaces 115 and 117. The touch screen 120 is disposed on the front surface 111 and configured as a user interface (UI) of the first unit 10. The receptacle 130 and the switch 140 are disposed on the lateral surface 117 to facilitate a connection between the electronic device 1 and other peripheral equipment or a power source, but it should not be limited thereto. In another embodiment, the receptacle 130 and the switch 140 can be disposed on any other position of the housing 110. In still another embodiment, the first unit 10 includes a plurality of receptacles 130.

The two connecting members 150 are disposed on the opposite lateral surfaces 115 and 117 and protrude from the lateral surfaces 115 and 117, respectively. Specifically, the two connecting members 150 of a circular cross section are respectively extended outwardly from the lateral surfaces 115 and 117 adjacent to the bottom surface 119. In some embodiment, when the first unit 10 is separated from the second unit 20 for independent operation, the two connecting members 150 may be retracted into the lateral surfaces 115 and 117 by suitable means. The rear surface 113 of the housing 110 further includes an accommodation space 114. The supporting member 170 is connected to the housing 110 and pivotable about a rotation axis $C_2$. In the first mode of the electronic device (FIG. 1), the supporting member 170 is pivoted outside of the accommodation space 114, and in the second mode of the electronic device (FIG. 2), the supporting member 170 is received in the accommodation space 114.

As shown in FIG. 3, a thickness of the housing 110 of the first unit 10 varies at different parts thereof, wherein a first part 110a of the first unit 10 has a first thickness $T_1$, and the second part 110b of the first unit 10 has a second thickness $T_2$. The first thickness $T_1$ is smaller than the second thickness $T_2$. Advantages due to such structural features will be described in part in the following.

Referring to FIG. 3, the second unit 20 includes a stand 210, a keyboard module 230, and two fixing members 250. The stand 210 has a first frame 211, a second frame 213, and a third frame 215. The first and second frames 211 and 213 extend along the same direction from two opposite ends of the third frame 215. The first frame 211 has an upper surface 211a and an inner surface 211b adjacent to the upper surface 211a, and the second frame 213 has an upper surface 213a and an inner surface 213b adjacent to the upper surface 213a, wherein the inner surface 211b and the inner surface 213b face each other. The keyboard module 230 is physically disposed among the first, second and third frames 211, 213 and 215, and a signal connection is established between the keyboard module 230 and the first unit 10 by wireless communication technology such as Bluetooth technology.

Each of the first and second frames 211 and 213 includes a guiding rail 270 disposed on the inner surfaces 211b and 213b of the first and second frames 211 and 213. In the embodiment, the guiding rails 270 of the first and second frames 211 and 213 have an identical configuration. For brevity of the specification, only the configuration of the guiding rail 270 of the first frame 211 will be described in the following. However, it is appreciated that the guiding rails 270 of the first and second frames 211 and 213 may have different configurations.

Figure 4A:
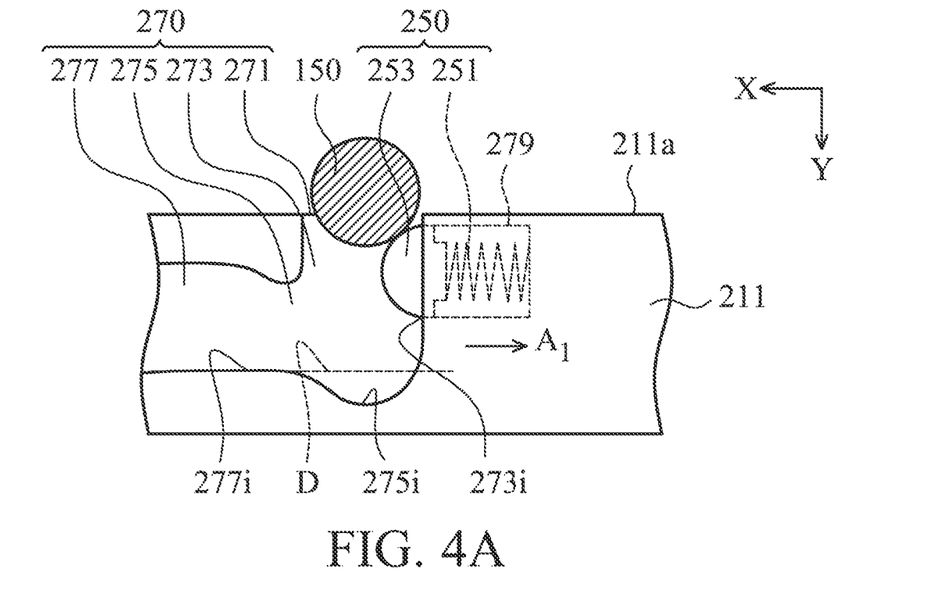
FIG. 4A shows a cross-sectional view of partial elements of the electronic device of FIG. 1, wherein a connecting member moves in a first section of the guiding rail.

Referring to FIGS. 3 and 4A, the guiding rail 270 of the first frame 211 includes an opening 271 disposed on the upper surface 211a of the first frame 211. Additionally, the guiding rail 270 has a first section 273, a second section 275 and a third section 277 connected successively. The first section 273 of the guiding rail 270 substantially extends along a first direction (Y-axis) from the opening 271, and the third section 277 extends along a second direction (X-axis) which is perpendicular to the first direction (Y-axis), but it should not limited thereto. In some other embodiments, the first direction (Y-axis) is different from the second direction (X-axis). Still, in some other embodiments, the third section 277 of the guiding rail 270 extends in a non-linear fashion.

As shown in FIG. 4A, the second section 275 of the guiding rail 270 has a curved inner wall 275i, and the first and third sections 273 and 277 of the guiding rail 270 respectively have inner walls 273i and 277i adjacent to two opposite sides of the curved inner wall 275i. Note that a part of the curved inner wall 275i which directly faces the opening 271 is lower than an imaginary line D (indicated as doted line) extending from the inner wall 277i of the third section 277. Through the above-motioned structural features, after entering the second section 275, the connecting members 150 will firstly stay at the second section 275 and will not be moved into the third section 277 of the guiding rail 270 until an external force is applied thereon. Moreover, a recess 279 is disposed on the inner wall 273i of the first section 273 in a vicinity of the opening 271.

Figure 5:
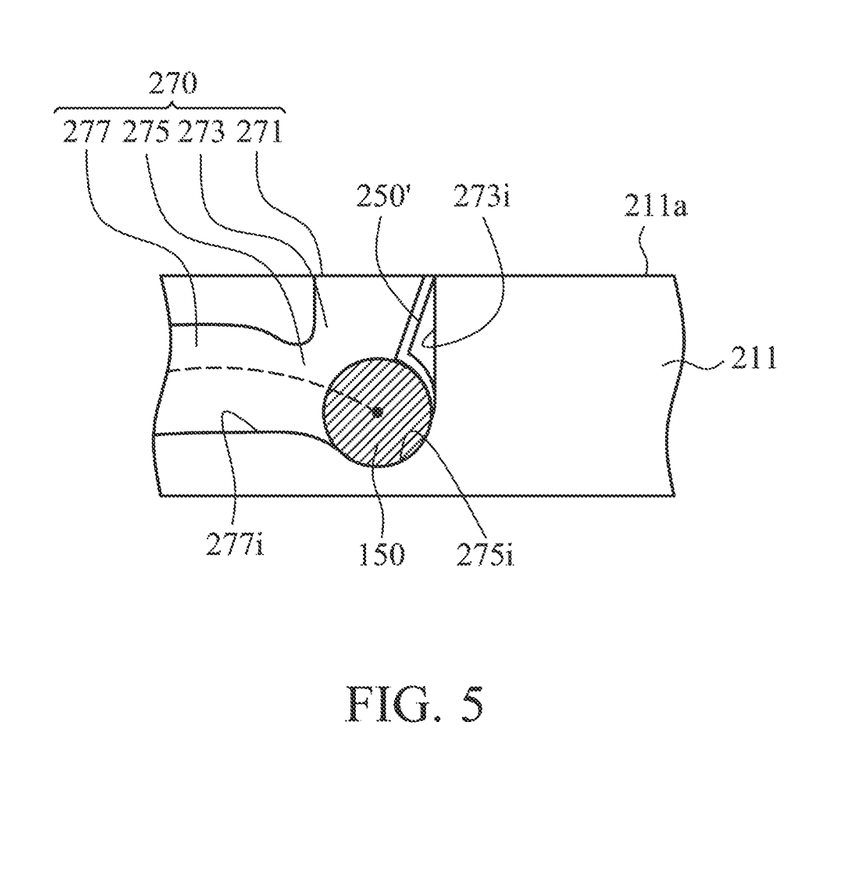
FIG. 5 shows a cross-sectional view of partial elements of an electronic device in accordance with another embodiment of the disclosure.

The fixing member 250 is disposed in the recess 279 and includes an elastic member 251 and a main body 253. In the embodiment, the elastic member 251 is a spring. An end of the spring 251 is connected to a bottom surface of the recess 279, and another end of the spring 251 is connected to the main body 253. After the main body 253 is abutted by an external force, the main body 253 retracts into the recess 279 along a direction indicated by an arrow $A_1$. The configuration of the fixing member 250 should not be limited to the above-mentioned embodiment. In another embodiment, as shown in FIG. 5, the fixing member 250' may be an elastic sheet, and the elastic sheet 250' is disposed on the inner wall 273i of the first section 273 of the guiding rail 270.

Referring to FIG. 3, the operation method of the electronic device 1 of the embodiment is described hereinafter. To combine the first and second units 10 and 20, the two connecting members 150 of the first unit 10 are inserted into the two guiding rails 270 via the openings 271 of the two guiding rails 270.

Figure 4B:
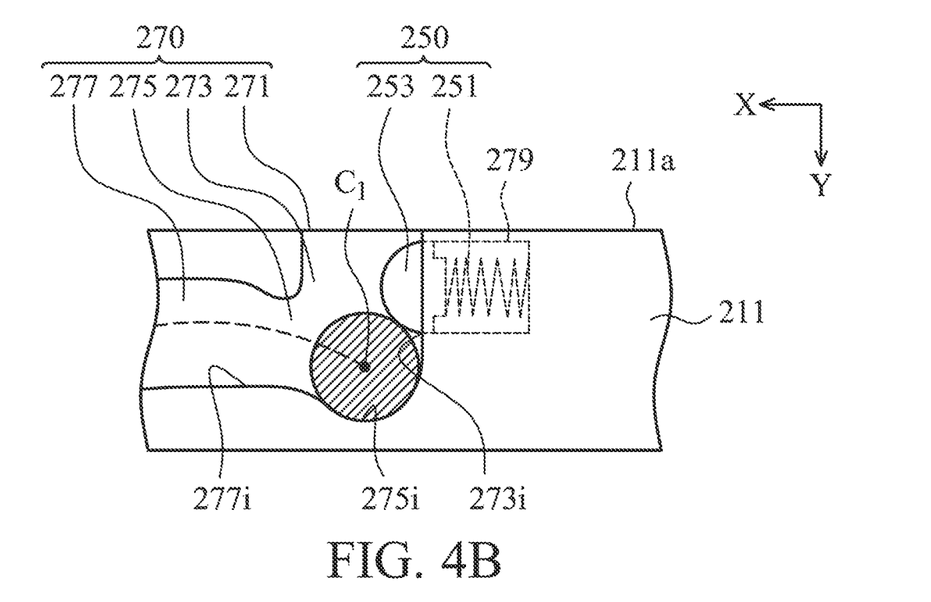
FIG. 4B shows a cross-sectional view of partial elements of the electronic device of FIG. 1, wherein the connecting member stays in a second section of the guiding rail.

As shown in FIG. 4A, when one of the two connecting members 150 passes through the first section 273, the elastic member 251 of the fixing member 250 is abutted by the connecting member 150. Thus, the main body 253 retracts into the recess 279 along the direction indicated by the arrow $A_1$. As shown in FIG. 4B, after the fixing member 150 leaves the first section 273 and enters the second section 275, the connecting member 150 abuts the curved inner walls 275i of the second section 275. At the same time, a resilient force is provided by the elastic element 251 to push the main body 253 to its original position. Therefore, the connecting member 150 is restrained between the fixing member 250 and the curved inner wall 275i and is rotatable around a rotation axis $C_1$ which is parallel to a centre of curvature of the curved inner wall 275i.

Figure 6:
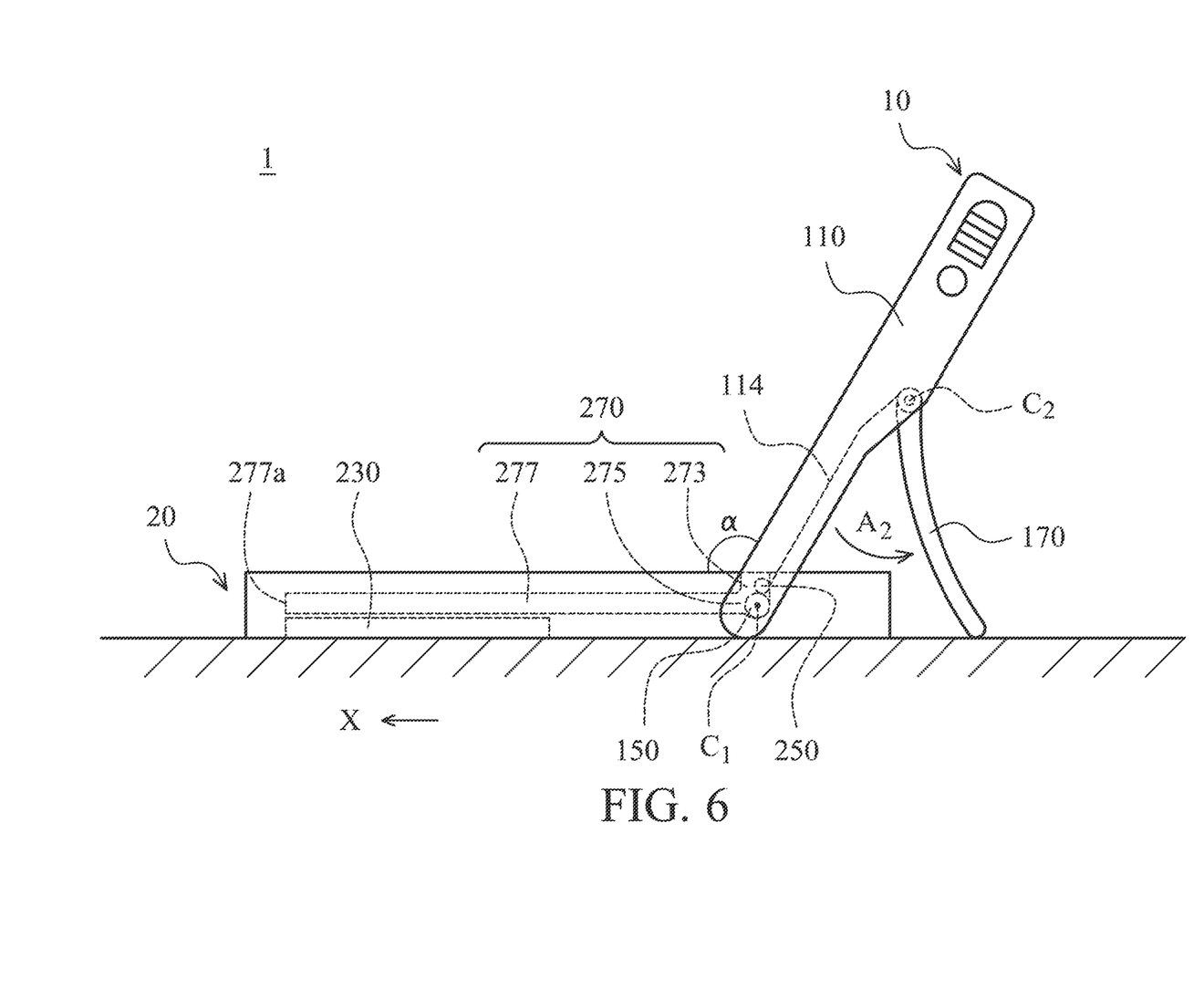
FIG. 6 shows a side view of the electronic device of FIG. 1 in the first mode.

Referring to FIG. 6, before or after the first unit 10 is connected to the second unit 20, the supporting member 170 of the first unit 10 may be pivoted to the outside (as indicated by arrow $A_2$) of the accommodation space 114 about a rotation axis $C_2$ that is parallel to the rotation axis $C_1$ to support the first unit 10 when the electronic device 1 is in the first mode. In the first mode, an included angle α formed between the first and second units 10 and 20 may be adjusted by rotating the first unit 10 around the rotation axis $C_1$ so as to enable the first unit 10 to be positioned at a comfortable viewing angle for a user to use the keyboard module 230 or for a viewer to watch a displayed image. Additionally, supported by the supporting member 170, the first unit 10 may not shake due to a touch operation.

Still referring to FIG. 6, when switching the electronic device 1 from the first mode to the second mode, the supporting frame 170 is firstly pivoted about the rotation axis $C_2$ to be received in the accommodation space 114, and the first unit 10 is rotated about the rotation axis $C_1$ and is simultaneously pushed by a thrust force along the second direction (X-axis) so that the two connecting members 150 may leave the second sections 275 and enter the corresponding third sections 277. The first unit 10 is continuously pushed along the second direction (X-axis) so that the two connecting members 150 of the first unit 10 slide to the third section 277 of the guiding rail 270 until reaching the end portions 277a of the third section 277. As shown in FIG. 2, in the second mode of the electronic device 1, the first part 110a of the housing 110 overlaps the keyboard module 230 of the second unit 20. Due to the fact that the thickness of the first part 110a is smaller than that of the second part 110b of the housing 110, the thickness of the electronic device 1 is minimized, thus enhancing portability of the electronic device 1.

Figure 7:
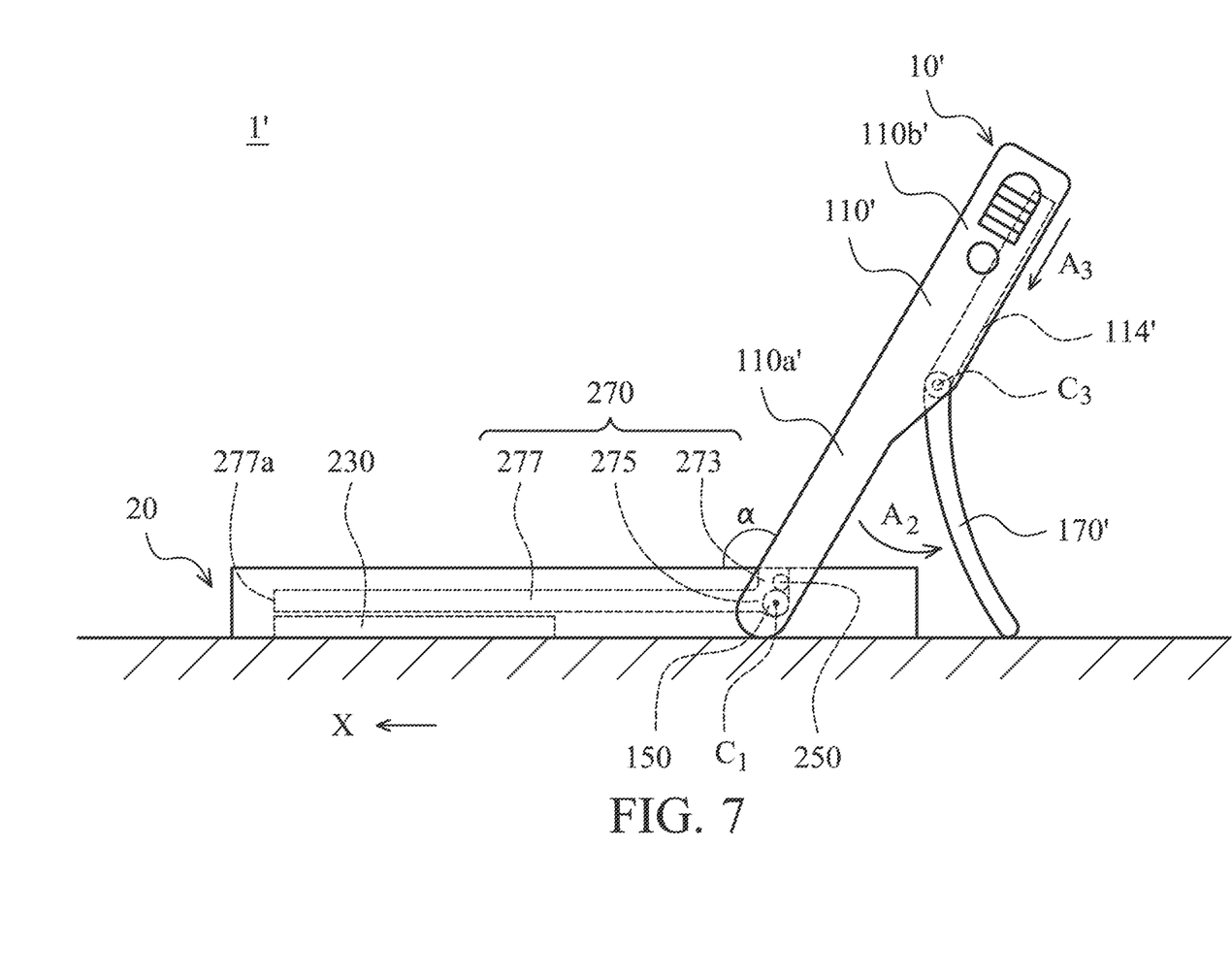
FIG. 7 shows a side view of an electronic device in accordance with still another embodiment of the disclosure in a first mode.

Referring to FIG. 7, which shows an explosive view of an electronic device 1' of another embodiment of the disclosure. Since elements similar with that of the electronic device 1 shown in FIGS. 1-6 are provided with the same reference numbers, thus, the features thereof are not reiterated in the interest of brevity. The electronic device 1' includes a first unit 10' and a second unit 20. The electronic device 1' is characterized in that the first unit 10' includes an accommodation space 114' disposed in a second part 110b' of a housing 110', wherein a supporting member 170' disposed in the accommodation space 114'. To operate the supporting member 170', the supporting member 170' is pulled to the outside of the accommodation space 114' along a predetermined direction (as indicated by arrow $A_3$) and rotated about a rotation axis $C_3$ to a proper position to support the first unit 10'.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
   a first unit, comprising:
      a housing, having two opposite lateral surfaces; and
      a connecting member, disposed on one of the two lateral surfaces; and
   a second unit, comprising:
      a stand, wherein a guiding rail is disposed in the stand, and the guiding rail comprises an opening, a first section substantially extending along a first direction from the opening, a second section connected to the first section, and a third section connected to the second section and extending along a second direction which is different from the first direction; and
      a fixing member, disposed at the first section of the guiding rail,
   wherein the electronic device is arranged such that after the first unit is selectively connected to the second unit, the connecting member is inserted into the guiding rail via the opening, wherein the movement of the connecting member in the first section causes a displacement of the fixing member, and after the connecting member passes through the first section and enters the second section, the connecting member is retained by the fixing member.

2. The electronic device as claimed in claim 1, wherein when the connecting member is located in the second section, the connecting member is retained between the fixing member and an inner wall of the second section.

3. The electronic device as claimed in claim 2, wherein the inner wall of the second section comprises a curved inner wall, and when the connecting member is located in the second section, the connecting member is retained between the fixing member and the curved inner wall of the second section.

4. The electronic device as claimed in claim 3, wherein the third section of the guiding rail has another inner wall adjacent to the curved inner wall of the second section, and a height of a portion of the curved inner wall of the second section is below an imaginary line extending from the inner wall of the third section.

5. The electronic device as claimed in claim 3, wherein when the connecting member is located in the second section, the connecting member is rotatable around a rotation axis which is parallel to a centre of curvature of the curved inner wall.

6. The electronic device as claimed in claim 1, wherein a recess is disposed on an inner wall of the first section, and the fixing member comprises an elastic member and a main body, wherein the elastic member is connected between a bottom surface of the recess and the main body, and the main body is retractable into the recess after the main body is pushed by an external force.

7. The electronic device as claimed in claim 1, wherein the fixing member comprises an elastic sheet disposed on an inner wall of the first section of the guiding rail.

8. The electronic device as claimed in claim 1, wherein the electronic device is adjustable between:
   a first mode, wherein in the first mode the connecting member is located in the second section, and a included angle is formed between the first unit and the second unit; and
   a second mode, wherein in the second mode the connecting member is located in an end portion of the third section which is away from the second section, and the first unit overlaps the second unit.

9. The electronic device as claimed in claim 8, wherein the first unit further comprises a supporting member pivotably connected to the housing, wherein the housing comprises an accommodation space, and the supporting member is pivoted to an outside of the accommodation space in the first mode, and the supporting member is received in the accommodation space in the second mode.

10. The electronic device as claimed in claim 1, wherein the first unit is a computer with a built-in touch screen interface with an operation system, and the second unit comprises a keyboard module which is electrically connected to the computer.

\* \* \* \* \*